US007805129B1

(12) United States Patent
Issa et al.

(10) Patent No.: US 7,805,129 B1
(45) Date of Patent: Sep. 28, 2010

(54) USING DEVICE CONTENT INFORMATION TO INFLUENCE OPERATION OF ANOTHER DEVICE

(75) Inventors: Alfredo C. Issa, Apex, NC (US); Christopher M. Amidon, Apex, NC (US); Richard J. Walsh, Raleigh, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 408 days.

(21) Appl. No.: 11/318,704

(22) Filed: Dec. 27, 2005

(51) Int. Cl.
*H04M 1/725* (2006.01)
(52) U.S. Cl. ............... 455/412.1; 370/338; 370/328; 370/310; 455/3.01; 455/41.2; 455/414.3; 705/10
(58) Field of Classification Search .............. 455/412.1; 370/338; 705/10
See application file for complete search history.

(56) References Cited

U.S. PATENT DOCUMENTS

| | | | | |
|---|---|---|---|---|
| 5,195,813 A | * | 3/1993 | Brown | ........................ 362/464 |
| 6,112,186 A | * | 8/2000 | Bergh et al. | .................... 705/10 |
| 6,987,221 B2 | * | 1/2006 | Platt | ........................... 84/601 |
| 2005/0038819 A1 | * | 2/2005 | Hicken et al. | ............. 707/104.1 |
| 2005/0251576 A1 | * | 11/2005 | Weel | .......................... 709/227 |
| 2006/0095516 A1 | * | 5/2006 | Wijeratne | ................... 709/205 |

* cited by examiner

*Primary Examiner*—Huy Phan
*Assistant Examiner*—Chuck Huynh
(74) *Attorney, Agent, or Firm*—Withrow & Terranova, PLLC (57) ABSTRACT

The present invention provides a system and method for recommending operational information, such as play lists or settings, for one or more devices associated with a local wireless network based on content information describing content stored on a number of user devices within the local wireless network. More specifically, a recommendation engine obtains the content information for a number of user devices within the local wireless network from either a central node or the user devices and analyzes the content information to recommend operational information for one or more devices associated with the local wireless network.

21 Claims, 8 Drawing Sheets

USING DEVICE CONTENT INFORMATION TO INFLUENCE OPERATION OF ANOTHER DEVICE

FIELD OF THE INVENTION

The present invention relates to a system and method for influencing device operation such as content played by a media player based on information describing content stored at a number of user devices.

BACKGROUND OF THE INVENTION

Portable digital media players such as Moving Picture Experts Group (MPEG) Audio Layer 3 (MP3) players have become commonplace in our society. In addition, mobile terminals such as mobile telephones and Personal Digital Assistants (PDAs) have evolved such that users of these devices can store various types of content such as digital audio, digital video, and digital images. Information describing the content stored on a user's device is indicative of the likes and dislikes of the user. For example, the genres, artist names, album names, and titles of songs stored on a mobile device are indicative of the user's preferred music. What is needed is a system for obtaining the information, or metadata, describing the content stored on devices and using this information to influence the user's environmental surroundings by, for example, influencing content played by a nearby media player.

SUMMARY OF THE INVENTION

The present invention provides a system and method for recommending operational information, such as play lists or settings, for one or more devices associated with a local wireless network based on content information describing content stored on a number of user devices within the local wireless network. More specifically, a recommendation engine obtains the content information for a number of user devices within the local wireless network from either a central node or the user devices and analyzes the content information to provide operational information for one or more devices associated with the local wireless network.

For example, the recommendation engine may obtain content information including a genre, artist name, album name, and title for each of a number of songs stored on the user devices within the local wireless network. The recommendation engine may then analyze the content information to recommend a play list for a media player associated with the local wireless network. The play list may include the most popular genres, artists, albums, songs, or a combination thereof among the user devices within the local wireless network. Based on the play list, the media player may select actual content to play. The actual content may be selected from a content storage unit associated with the media player or obtained from a remote source such as one of the user devices within the local wireless network, a user device outside of the local wireless network via a network such as the Internet, another media device via the network, or a network node associated with the network which provides content for download or purchase.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides a system and method for recommending operational information, such as play lists or settings, for one or more devices associated with a local wireless network based on content information describing content stored on a number of user devices within the local wireless network. More specifically, a recommendation engine obtains the content information for a number of user devices within the local wireless network from either a central node or the user devices and analyzes the content information to recommend content or settings for one or more devices associated with the local wireless network. For example, the recommendation engine may obtain content information including a genre, artist name, album name, and title for each of a number of songs stored on the user devices within the local wireless network. The recommendation engine may then analyze the content information to recommend a play list for a media player associated with the local wireless network.

Figure 1:
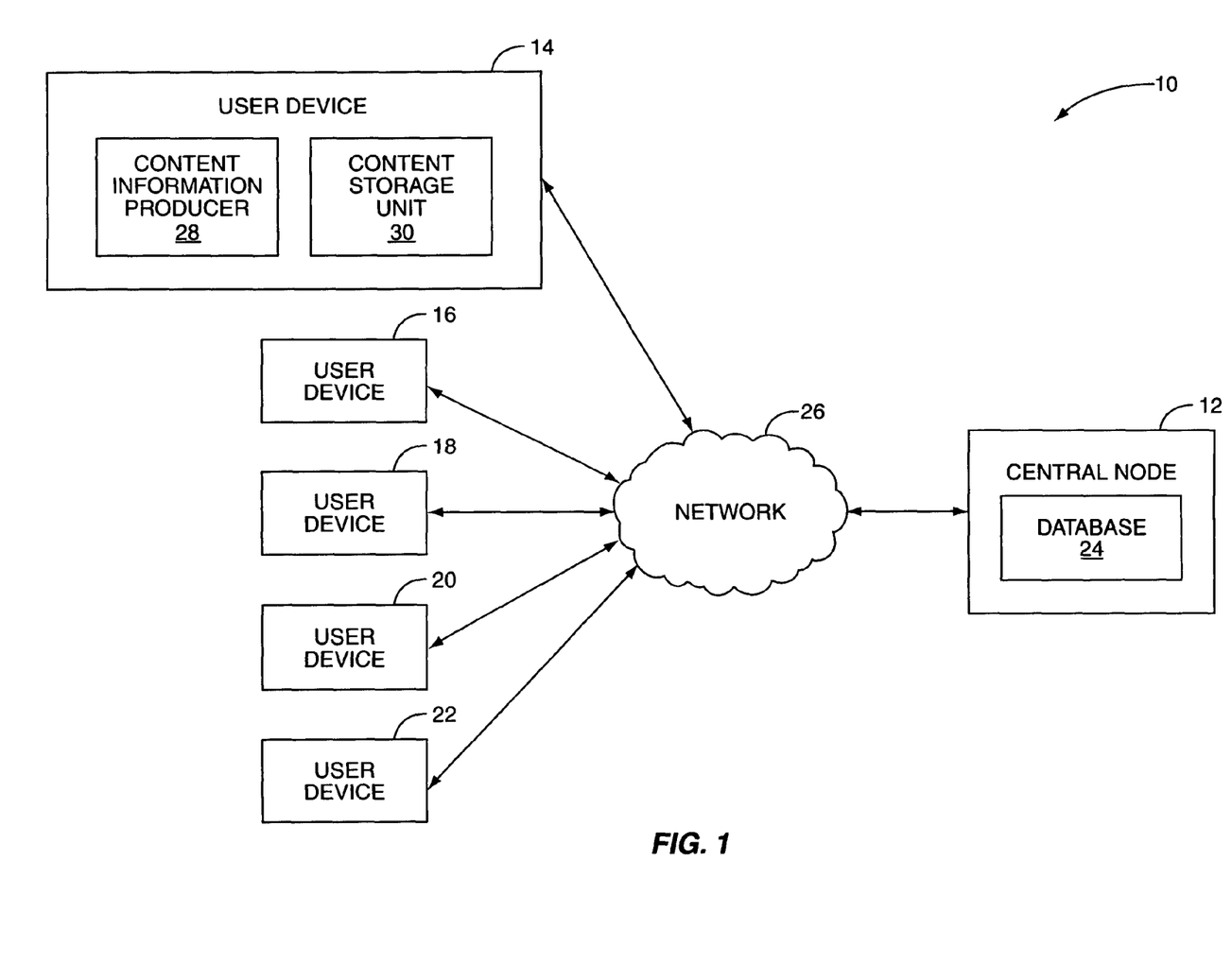
FIG. 1 illustrates a system including a central node and user devices wherein the central node obtains and stores content information describing content stored on each of the user devices according to one embodiment of the present invention.

FIG. 1 illustrates a system 10 including a central node 12 for obtaining content information from a number of user devices 14-22 and storing the content information in a database 24. In general, the central node 12 is a server and is communicatively coupled to a network 26. Preferably, the network 26 is the Internet. Note that the central node 12 may alternatively include a number of servers and databases operating as a single central node 12.

The user devices 14-22 may be notebook computers, Personal Digital Assistants (PDAs), mobile telephones providing both voice and data communications, or the like. Further, the user devices 14-22 may include stationary devices such as desktop computers and the like. The user devices 14-22 are communicatively coupled to the network 26, for example through wired or wireless communication links. The user devices 14-22 may include wireless transceivers operating according to a cellular communications standard or the Wireless-Fidelity (Wi-Fi) standard to provide wireless communication links between the user devices 14-22 and the network 26.

As illustrated, the user device 14 includes a content information producer 28 and a content storage unit 30. Note that the discussion herein of the user device 14 is equally applicable to the user devices 16-22. The content information producer 28 is preferably implemented in software and operates to obtain content information, or metadata, describing content stored in the content storage unit 30 or a subset thereof and provide the content information to the central node 12 via the network 26. The content information may include a genre, artist name, album name, and title for each song stored in the content storage unit 30; a genre, title, and list of one or more actors and actresses staring in each video stored in the content storage unit 30; keywords, captions, location of capture, date and time of capture for each digital image stored in the content storage unit 30; bookmarked URLs stored in the content storage unit 30; and lists of dialed and received telephone numbers stored in the content storage unit 30. For digital assets such as audio files, video files, and images, the content information may be stored as part of the digital asset file or in an application file associated with the digital asset. For example, the Joint Photography Experts Group (JPEG) standard enables standard content information and additional user defined content information to be stored as metadata in the header of JPEG image files. In addition, the content information may include information identifying the content currently being played or viewed at the user device 14.

The content storage unit 30 may be implemented as memory, such as, for example, Random Access Memory (RAM) or as a storage device such as a hard disc drive. The content storage unit 30 operates to store digital assets or content such as audio files, video files, images, slideshows, bookmarked Uniform Resource Locators (URLs), lists of dialed and received telephone numbers, or any combination thereof.

In operation, the user device 14, and more specifically the content information producer 28, operates to provide the content information describing the content in the content storage unit 30 or a portion thereof to the central node 12. When received by the central node 12, the content information is stored in the database 24 in association with an identifier (ID) of the user device 14. For security, a user associated with the user device 14 may identify only a portion of the content stored in the content storage unit 30 for which the content information is to be provided to the central node 12. After initially providing the content information to the central node 12, the user device 14 may update the content information periodically or when content is added to or removed from the content storage unit 30. Likewise, each of the user devices 16-22 provides content information to the central node 12. As a result, the database 24 at the central node 12 stores the content information describing the content stored by each of the user devices 14-22.

Figure 2:
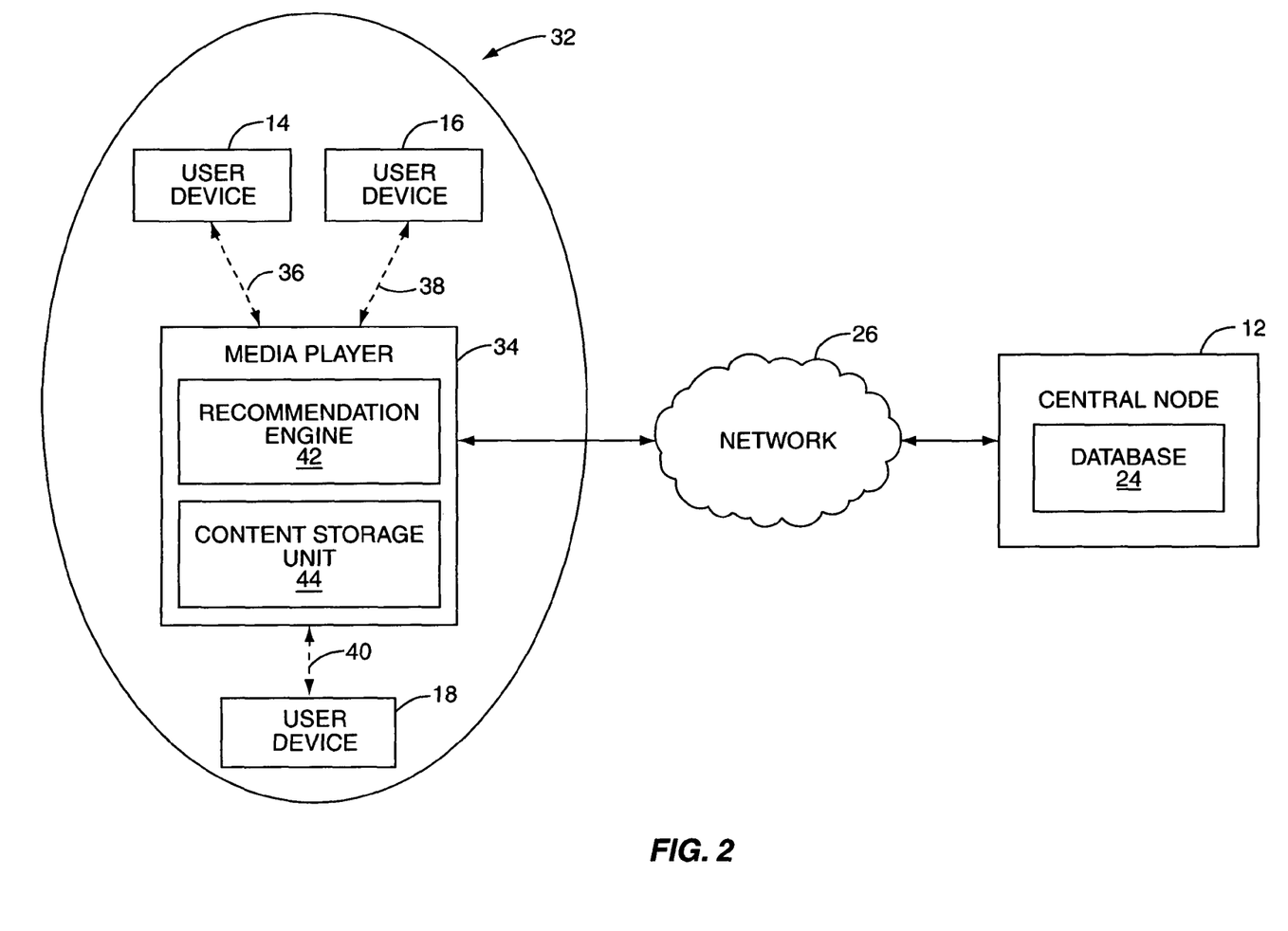
FIG. 2 illustrates an exemplary local wireless network wherein a recommendation engine recommends a play list for a media player based on the content information for a number of user devices within the local wireless network according to one embodiment of the present invention.

FIG. 2 illustrates a local wireless network 32, wherein content played by a media player 34 associated with the local wireless network 32 is influenced by the content information for the user devices 14-18 according to one embodiment of the present invention. The local wireless network 32 includes the media player 34 and the user devices 14-18. The media player 34 is communicatively coupled to the central node 12 via the network 26, for example through a wired or wireless interface. The media player 34 and the user devices 14-18 communicate via transceivers (not shown) operating according to a low power wireless communication standard such as, but not limited to, one of the Bluetooth, Zigbee, IEEE 802.11, or Wireless Fidelity (Wi-Fi) standards to provide wireless communication links 36-40. The local wireless network 32 may be formed within a person's home or office or in a public area such as a restaurant, store, shopping center, or the like. Note that while the local wireless network 32 is illustrated as including the three user devices 14-18, the local wireless network 32 may include any number of user devices. In addition, the user devices 14-18 are free to enter and leave the local wireless network 32.

The media player 34 may play audio content, video content, digital image slideshows, or the like. For example, the media player 34 may be a personal computer having media player software for playing digital audio files, video files, or slideshows; a television or associated device for playing video content such as movies or television programs; a radio such as an AM/FM radio or a satellite radio; a digital picture frame; or a digital billboard.

As illustrated, the media player 34 includes a recommendation engine 42 and a content storage unit 44. Although not shown, the media player 34 also includes other software, hardware, or combination thereof for playing content as will be apparent to one of ordinary skill in the art upon reading this disclosure. Although the recommendation engine 42 is illustrated as being part of the media player 34, the recommendation engine 42 may alternatively be a separate device communicatively coupled to the media device 34 through either a wired or wireless connection. If the recommendation engine 42 is implemented as a separate device, it is preferably connected to the network 26. The recommendation engine 42 may be implemented in software, hardware, or a combination thereof.

The content storage unit 44 may be implemented as memory, such as, for example, Random Access Memory (RAM), or as a storage device such as a hard disc drive. The content storage unit 44 operates to store digital assets or content such as, but not limited to, audio files, video files, images, slideshows, or any combination thereof. If the media player 34 is a radio, television, or like device, the content storage unit 44 may store information describing each of a number of radio or television stations such as the genre of each of the stations or content currently playing on the stations.

Figure 3:
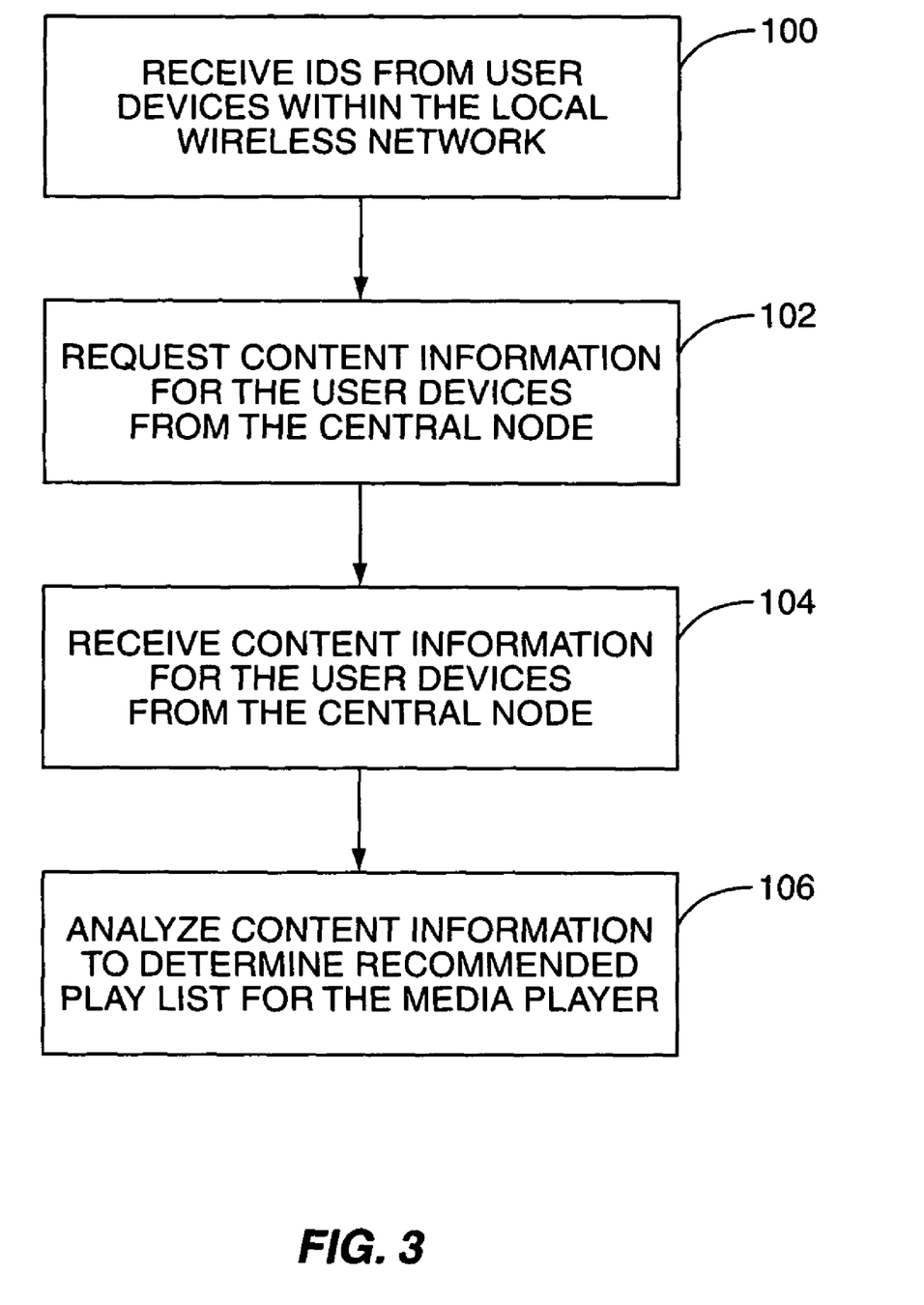
FIG. 3 illustrates the operation of the recommendation engine of FIG. 2 according to one embodiment of the present invention.

FIG. 3 illustrates the operation of the recommendation engine 42 in FIG. 2 according to one embodiment of the present invention. First, the recommendation engine 42 receives the IDs of the user devices 14-18 within the local wireless network 32 from the user devices 14-18 via the wireless communication links 36-40 (step 100). The IDs may be provided by the user devices 14-18 automatically upon entering the local wireless network 32. For example, the user devices 14-18 may periodically broadcast their IDs. Alternatively, the media player 34, and more specifically the recommendation engine 42, may send a request to all user devices within the local wireless network 32, wherein the user devices 14-18 respond by providing their IDs.

After receiving the IDs of the user devices 14-18, the recommendation engine 42 sends a request for content information for the user devices 14-18 to the central node 12 (step 102). The request includes the IDs of the user devices 14-18 and may request the content information describing all of the content stored by the user devices 14-18 or a subset thereof. For example, if the media player 34 plays only audio content, the recommendation engine 42 may request only the content information describing the audio content stored at the user devices 14-18. Upon receiving the request from the recommendation engine 42, the central node 12 uses the IDs to query the database 24 for the content information for the user devices 14-18. After identifying the content information for the user devices 14-18 based on the IDs, the central node 12 provides the content information to the recommendation engine 42.

In one embodiment, the central node 12 may additionally search the content information for the user devices 14-18 for information such as dialed or received telephone number lists. This information may be used by central node 12 to identify additional user devices to which the user devices 14-18 are closely related. For example, if the content information for the user device 14 includes dialed and received telephone number lists and these lists indicate that a particular telephone number is dialed and/or received frequently by the user device 14, the central node 12 may determine whether content information is stored for a user device associated with the telephone number. If so, the content information for the user device associated with the telephone number is identified as additional content information of interest and provided to the recommendation engine 42 along with the content information for the user devices 14-18. For example, if the user device 14 receives telephone calls from and dials a particular telephone number frequently, it may be assumed that the users of the two user devices are close friends. It is therefore likely that the users of the two user devices share similar interests. As such, the content information for the user device associated with the telephone number may be indicative of the preferences and interests of the user of the user device 14.

Once the recommendation engine 42 receives the content information for the user devices 14-18 (step 104), the recommendation engine 42 analyzes the content information to determine a recommended play list for the media player 34 (step 106). A recommended play list includes criteria enabling the media player 34 to select actual content to play. In one embodiment, the recommended play list may be provided by determining the most popular content among the user devices 14-18 within the local wireless network 32. For example, if the media player 34 plays audio content, the recommendation engine 42 may analyze the content information for the user devices 14-18 to determine the most popular genres, artists, albums, and/or songs among the user devices 14-18. The most popular genres, artists, albums, songs, or any combination thereof may be provided by the recommendation engine 42 as a recommended play list for the media player 34.

Using the recommended play list, the media player 34 selects content from the content storage unit 44 of the media player 34 to play at the media player 34. Thus, the content stored on the user devices 14-18, which is indicative of the preferences of the associated users, influences the content played by the media player 34. For example, if the recommended play list includes a particular artist and the content storage unit 44 at the media player 34 includes numerous songs by the particular artist, the media player 34 may select and play one or more of the songs by the particular artist. In addition or alternatively, the media player 34 may download and optionally purchase content matching the suggested play list from a remote source such as a network node coupled to the network 26, the user devices 14-18 in the local wireless network 32, other user devices registered with the central node 12 via the network 26, or other media players coupled to the network 26. This may be particularly beneficial when there is little or no content matching the recommended play list stored in the content storage unit 44.

In one embodiment, the recommendation engine 42 may be aware of the content stored in the content storage unit 44 by, for example, examining content information describing the content stored in the content storage unit 44. In this case, the recommendation engine 42 may operate to only recommend content matching actual content stored in the content storage unit. For example, if no songs by "Steely Dan" are stored in the content storage unit 44, the recommendation engine 42 may ensure that the recommended play list does not include "Steely Dan" or any albums or songs by "Steely Dan."

As stated above, the recommendation engine 42 may alternatively be implemented as a device separate from the media player 34. If so, rather than providing a recommended play list to the media player 34 as described above, the recommendation engine 42 may use the recommended play list to provide an actual play list to the media player 34. More specifically, the recommendation engine 42 may obtain content information describing the content stored in the content storage unit 44 of the media player 34 from the media player 34. Alternatively, the media player 34 may operate as a content producer and provide the content information for the media player 34 to central node 12 to be stored in the database 24. In this case, the recommendation engine 42 may obtain the content information for the media player 34 from the central node 12. After generating the recommended play list, the recommendation engine 42 may compare the recommended play list to the content information for the media player 34 to select content from the content storage unit 44 to play at the media player 34, thereby generating an actual play list including actual content to be played by the media player 34.

The recommendation engine 42 may additionally operate as a content information producer and broadcast the recommended play list to the user devices 14-18 and/or other recommendation engines within the local wireless network 32. In order to avoid "feedback," an identifier identifying the source of the play list is associated with the recommended play list, and the recommendation engine 42 ignores suggested play lists that it previously generated and broadcast through the local wireless network 32.

According to one embodiment of the present invention, when generating the recommended play list, the content information for the user devices 14-18 may be weighted based on longevity of the user devices 14-20 in the local wireless network 32, a Received Signal Strength Indication (RSSI) for each of the user devices 14-18, a number of times the user devices 14-18 have been in the local wireless network 32, or a distance of each of the user devices 14-18 from the media player 34 prior to generating the recommended play list. Regarding longevity, the content information for the user devices 14-18 may be weighted based on the amount of time that each of the user devices 14-18 has been in the local wireless network 32. For example, if the user device 14 has been in the local wireless network 32 for two hours and the user device 16 has been in the local wireless network 32 for twenty minutes, the recommendation engine 42 may assign weights to the content information for the user devices 14 and 16 such that the content information for the user device 14 has greater influence on the content played by the media player 34 than the content information for the user device 16.

Regarding RSSI, the content information for the user devices 14-18 having higher RSSIs may be given greater weight than the content information for the user devices 14-18 having lower RSSIs. Regarding the number of times that the user devices 14-18 have been in the local wireless network 32, the recommendation engine 42 may track the number of times that each of the user devices 14-18 have been in the local wireless network 32 and assign greater weights to the content information for the user devices 14-18 that are frequently within the local wireless network 32.

As for distance from the media player 34, the user devices 14-18 that are closer to the media player 34 may be given a greater weight than those of the user devices 14-18 that are further away from the media player 34. The distances between the user devices 14-18 and the media player 34 may be determined based on an amount of time required to receive a response at the recommendation engine 42 after sending a request, such as a ping request, to the user devices 14-18. Alternatively, the user devices 14-18 may be equipped with a Global Positioning System (GPS) receiver or the like and the media player 34 may have a known location or its own GPS receiver. The distances between the media player 34 and the user devices 14-18 may then be determined based on the locations of the media player 34 and the user devices 14-18. Note that the locations of the user devices 14-18 may be communicated to the recommendation engine 42 directly from the user devices 14-18. Alternatively, the user devices 14-18 may provide their locations to the central node 12 along with the content information, and the locations of the user devices 14-18 may be provided to the media player 34 from the central node 12 along with the content information for the user devices 14-18.

Weighting may alternatively or additionally be performed based on prearranged relationships between an operator associated with the recommendation engine 42 and users of one or more of the user devices 14-18. For example, the user of the user device 14 may have a prearranged relationship with the operator associated with the recommendation engine 42, wherein the prearranged relationship provides that the user device 14 is assigned a greater weight than the other user devices within the local wireless network 32. The prearranged relationship may require the user of the user device 14 to pay a fee to the operator associated with the recommendation engine 42.

As discussed above, as one example, the media player 34 may be an audio player such as an MP3 player wherein the recommended play list includes the most popular genres, artists, albums, songs, or a combination thereof among the user devices 14-18 within the local wireless network 32. As another example, the media player 34 may be a radio such as an AM/FM radio, a satellite radio, or a personal computer or other device capable of playing an Internet radio station. In this embodiment, the recommendation engine 42 may provide a recommended play list including one or more criterion that may be used by the media player 34 to select a radio station. Again, the criteria may be one or more of the most popular genres, artists, albums, or songs among the user devices 14-18. For example, if the most popular genre is "Rock," the recommended play list includes the genre "Rock," and the media player 34 may select a "Rock" radio station based on information defining the genre for a number of radio stations stored in the content storage unit 44.

As another example, the media player 34 may be a television or associated device capable of playing television content. In this embodiment, the recommendation engine 42 may provide a recommended play list including one or more criterion that may be used by the media player 34 to select television content such as a sporting event on a television station. For example, the criteria may be the most popular bookmarked websites among the user devices 14-18. If the most popular bookmarked website among the user devices 14-18 is the North Carolina State University (NCSU) website, the recommended play list may include NCSU. As a result, the media player 34 may select a television station currently showing a NCSU football or basketball game. As another example, the criteria may include the most popular movie genre among the user devices 14-18. As a result, the media player 34 may select a television station currently showing a movie from the most poplar genre.

As yet another example, the media player 34 may be a digital picture frame, digital billboard, television or associated device, personal computer, or like device capable of playing a slideshow or displaying a digital image. A slideshow includes a number of digital images and optionally audio. In this example, the recommendation engine 42 may analyze the content information for the user devices 14-18 to provide the most popular keywords used to tag digital images stored at the user devices 14-18, the most popular keywords appearing in captions stored in association with the digital images stored at the user devices 14-18, the most popular locations at which the digital images stored at the user devices 14-18 were captured, or the most popular dates or times at which the digital images stored at the user devices 14-18 were captured. The recommendation engine 42 may then recommend a play list including one or more of the most popular keywords, locations, or ranges of dates and/or times for the media player 34. Based on the recommended play list, the media player 34 may select a slideshow, a number of digital images to display as a slideshow, or a digital image from the content storage unit 44 to display at the media device 34.

Figure 4:
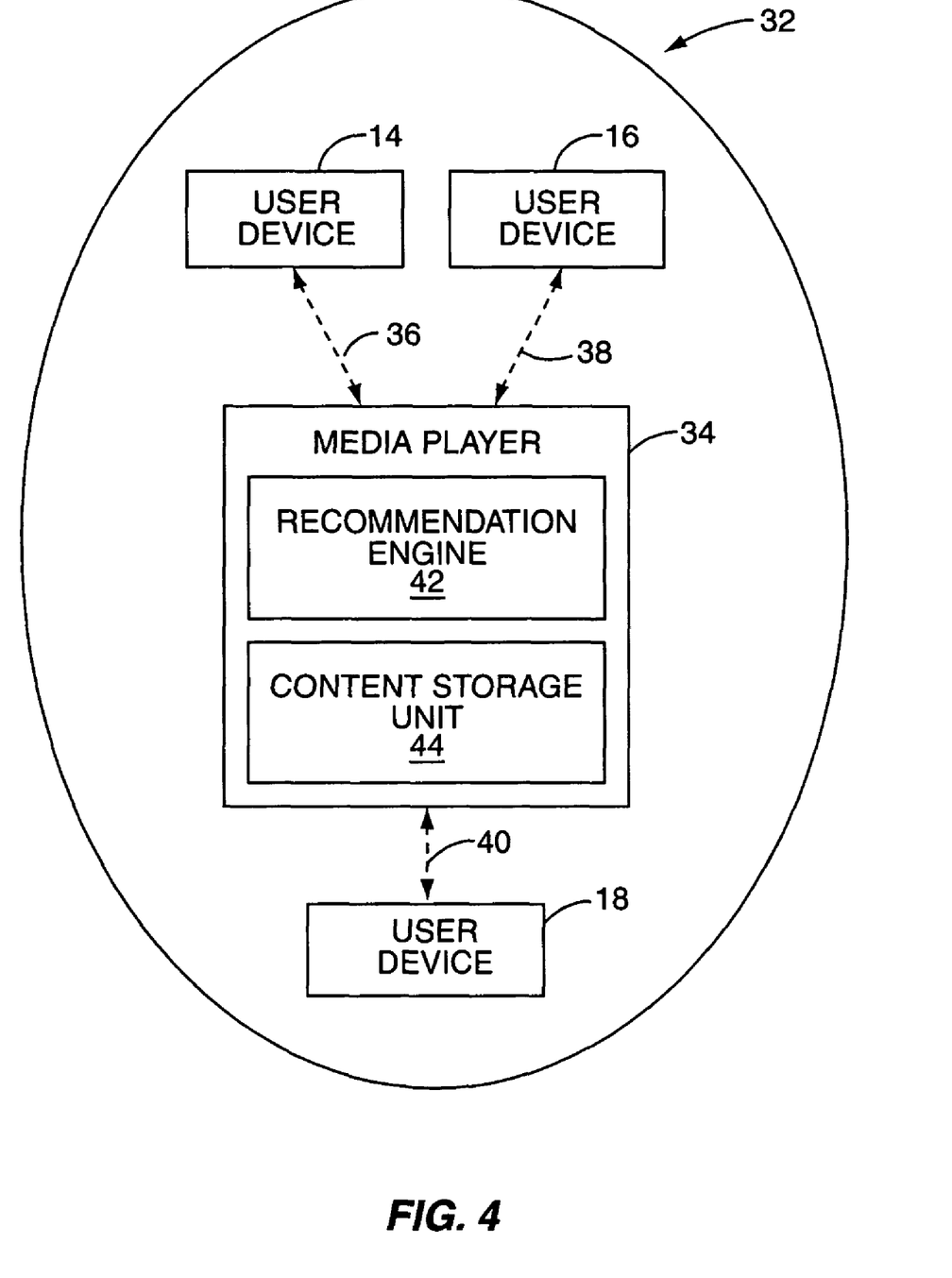
FIG. 4 illustrates an exemplary local wireless network wherein a recommendation engine recommends a play list for a media player based on the content information for a number of user devices within the local wireless network according to a second embodiment of the present invention.

FIG. 4 illustrates the local wireless network 32 according to another embodiment of the present invention. This embodiment is similar to that discussed above with respect to FIG. 2. However, in this embodiment, the recommendation engine 42 obtains the content information directly from the user devices 14-18 rather than from the central node 12 (FIG. 2).

Figure 5:
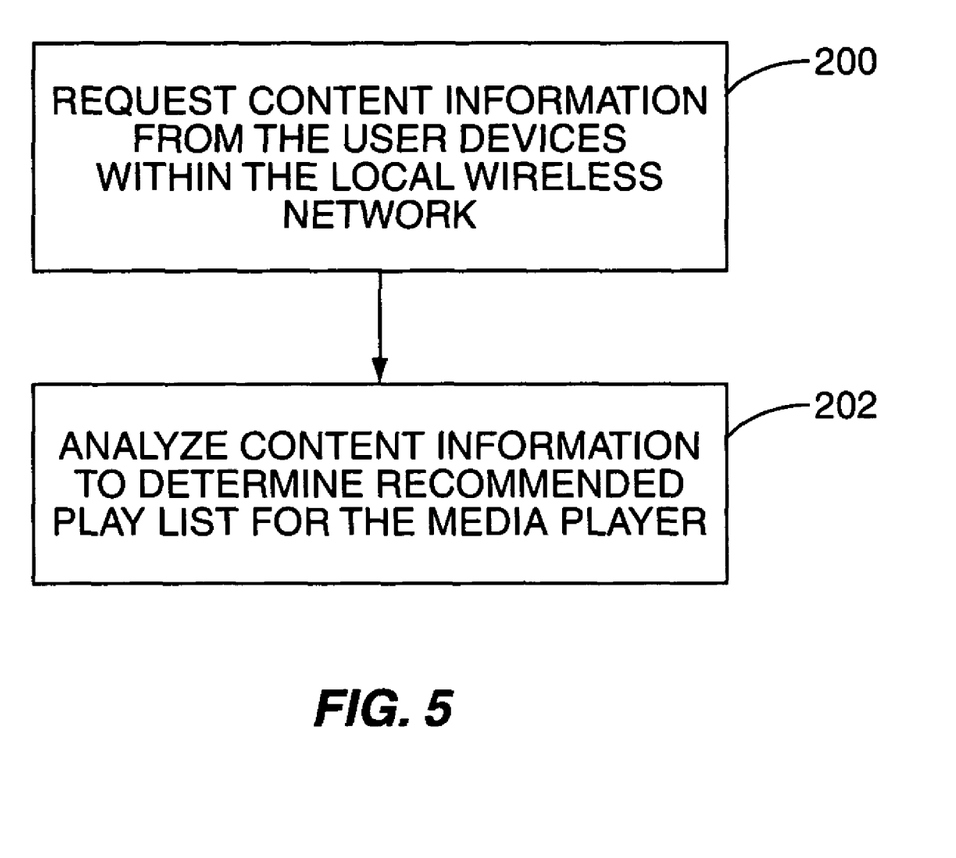
FIG. 5 illustrates the operation of the recommendation engine of FIG. 4 according to one embodiment of the present invention.

FIG. 5 illustrates the operation of the recommendation engine 42 of FIG. 4. First, the recommendation engine 42 obtains the content information from the user devices 14-18 within the local wireless network 32 (step 200). More specifically, the user devices 14-18, and specifically the content information producers 28 of the user devices 14-18, operate to provide the content information for the user devices 14-18 to the recommendation engine 342. The content information producers 28 of the user devices 14-18 may provide the content information or a subset thereof to the recommendation engine 42 upon entering the local wireless network 32 or periodically while in the local wireless network 32. Alternatively, the content information producers 28 of the user devices 14-18 may provide the content information in response to a request from the recommendation engine 42. The request from the recommendation engine 42 may request the content information describing all of the content stored by the user devices 14-18 or a subset thereof. For example, if the media player 34 plays only audio content, the recommendation engine 42 may request only the content information describing the audio content stored at the user devices 14-18. As discussed above, after receiving the content information for the user devices 14-18, the recommendation engine 42 analyzes the content information to determine a recommended play list for the media player 34 (step 202).

Figure 6:
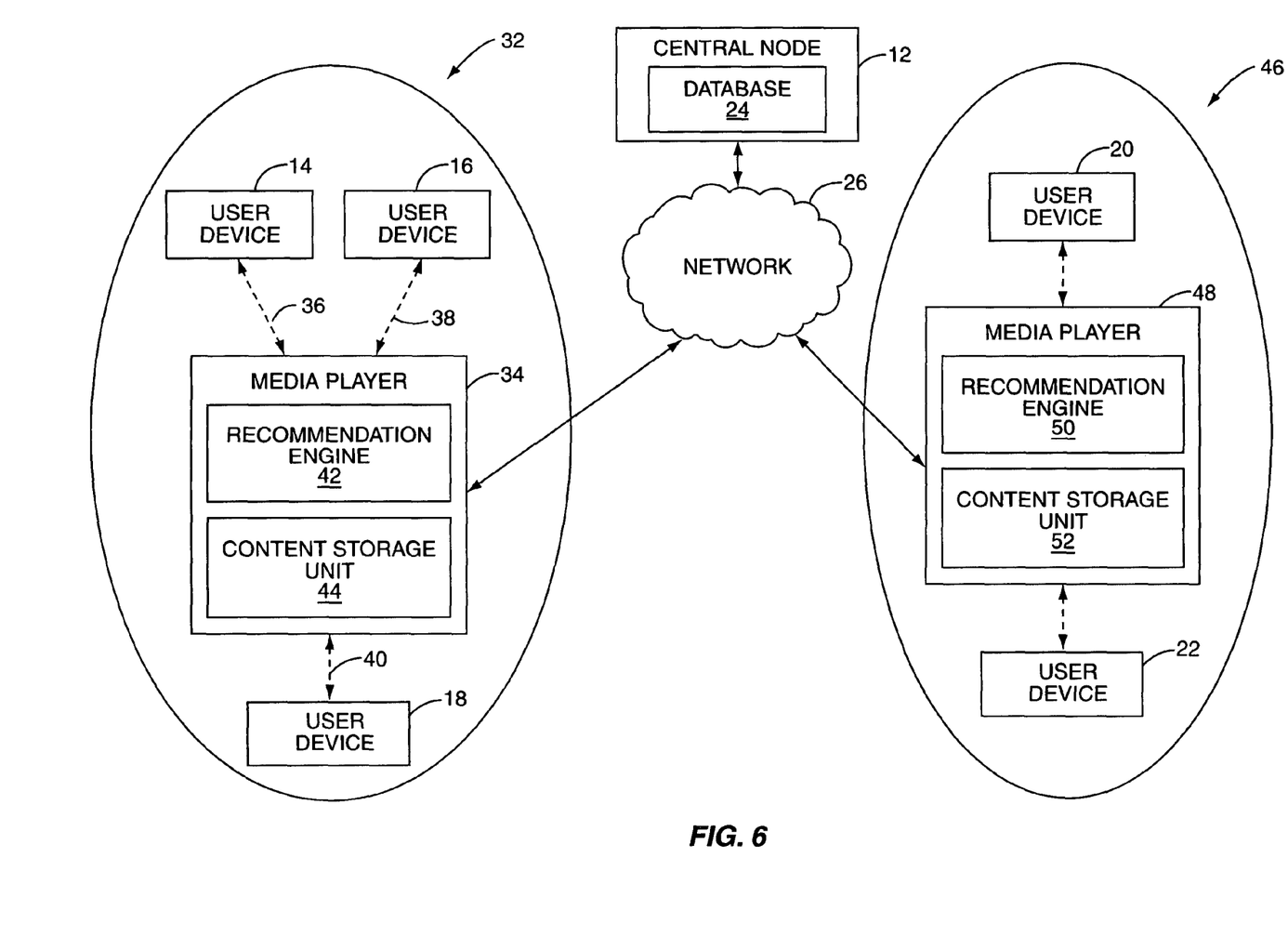
FIG. 6 illustrates a system including a first recommendation engine associated with a first local wireless network that obtains information identifying content played or that would be played by a second media player associated with a second local wireless network in response to a particular recommended play list according to one embodiment of the present invention.

FIG. 6 illustrates yet another embodiment of the present invention. In this embodiment, a second local wireless network 46 including a second media player 48 is included. The second media player 48 includes recommendation engine 50 and content storage unit 52. The second local wireless network 46, the second media player 48, and the recommendation engine 50 operate as described above with respect to the local wireless network 32, the media player 34, and the recommendation engine 42. In this embodiment, the local wireless networks 32 and 46 are located in similar environments. For example, the local wireless network 32 may be located in a first sports bar, and the second local wireless network 46 may be located in a second sports bar. When the recommendation engine 42 provides a recommended play list, the media player 34 may communicate with the second media player 48 to determine what content has been played or would be played by the second media player 48 based on the recommended play list or one or more criterion from the recommended play list. This may be particularly beneficial where there is no content matching the recommended play list at the media player 34 or where the media player 34 is unable to determine what content to play in response to the recommended play list for any reason. Upon receiving a response from the second media player 48, the media player 34 may obtain content previously played or that would be played by the second media player 48 for the recommended play list. The media player 34 may download and optionally purchase the content from a network node via the network 26, the second media player 48, one of the user devices 14-18 in the local wireless network 32, or one of the other user devices registered with the central node 12 via the network 26.

Alternatively, each time the recommendation engines 42 and 50 generate a recommended play list, the recommended play list and information identifying content actually selected and played in response to the recommended play list may be provided to the central node 12. At the central node 12, the recommended play lists and information selected and played in response to the recommended play lists may be stored in the database 24 in association with the corresponding one of media players 34 and 48 and/or a category of the local wireless networks 32 and 46. For example, the category of the local wireless networks 32 and 46 may be "Sports Bar." Thereafter, if the recommendation engine 42 provides a recommended play list for which the media player 34 has no matching content or is unsure as to what content to play in response to the recommended play list, the media player 34 may provide the recommended play list and optionally the category of the media player 34 or the local wireless network 32 to the central node 12. In response, the central node 12 may provide information to the media player 34 identifying content selected and played by media players such as the second media player 48 located in similar environments in response to one or more criteria from the recommended play list. In response, the media player 34 may download and optionally purchase the content from a network node via the network 26, the second media player 48, one of the user devices 14-18 in the local wireless network 32, or one of the other user devices registered with the central node 12 via the network 26.

Figure 7:
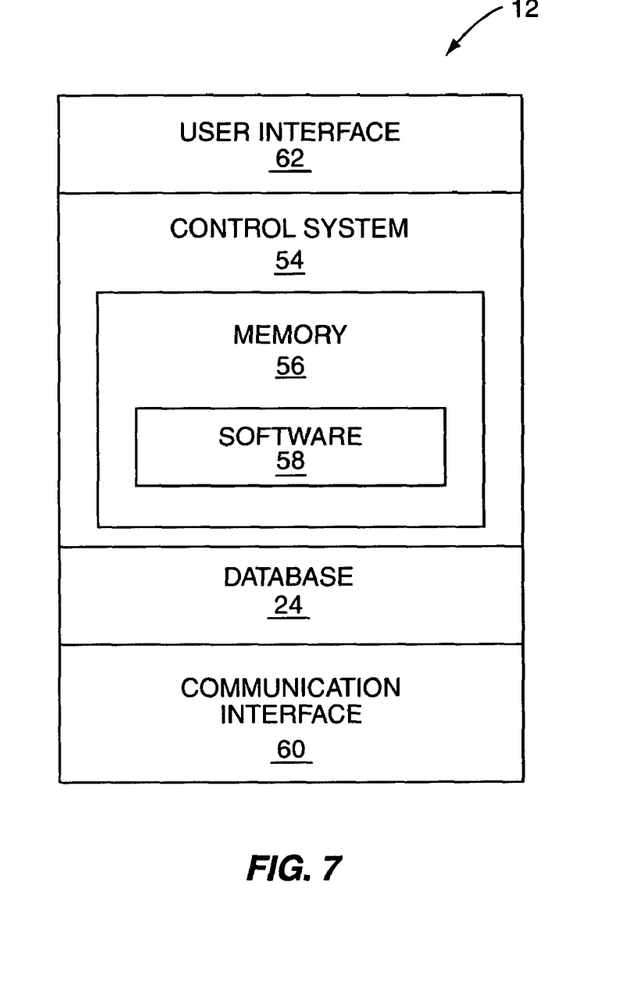
FIG. 7 illustrates an exemplary embodiment of the central node according to one embodiment of the present invention.

FIG. 7 is a block diagram of an exemplary embodiment of the central node 12. In general, the central node 12 includes a control system 54 and associated memory 56. The memory 56 may store software 58 controlling the operation of the central node 12 according to the present invention. The central node 12 also includes the database 24. The database 24 may be implemented as memory such as RAM or as one or more local or distributed storage devices such as hard disc drives. The central node 12 also includes a communication interface 60 communicatively coupling the central node 12 to the network 26 through either a wired or wireless interface. The central node 12 may also include a user interface 62. The user interface 62 may include a display, keyboard, mouse, and the like.

Figure 8:
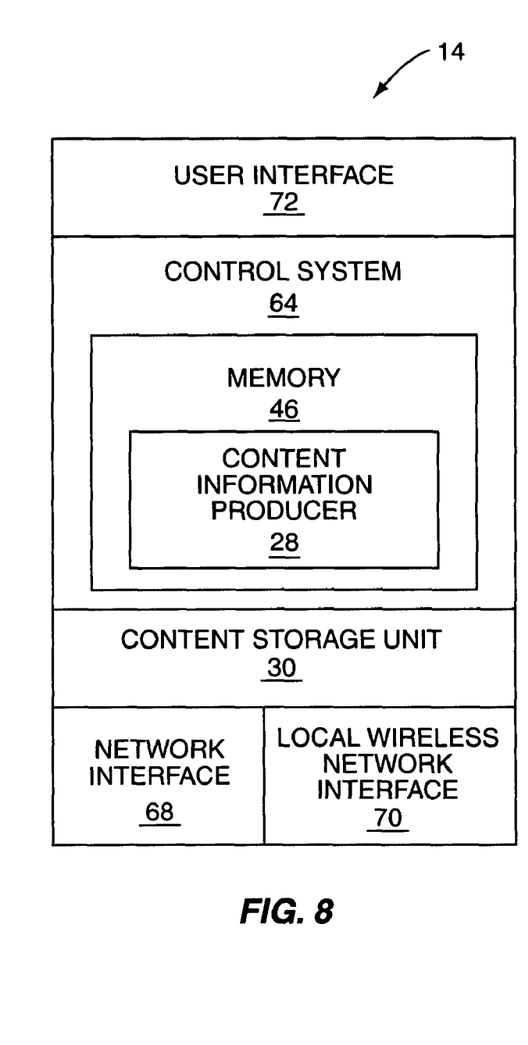
FIG. 8 illustrates an exemplary embodiment of a user device according to one embodiment of the present invention.

FIG. 8 is a block diagram of an exemplary embodiment of the user device 14. In general, the user device 14 includes a control system 64 and associated memory 66. The memory 66 may store software corresponding to the content information producer 28. The user device 14 also includes the content storage unit 30 which may be implemented as memory such as RAM or some other storage device such as a hard disc drive. Note that the content storage unit 30 may alternatively be implemented within the memory 66. The user device 14 also includes a network interface 68 communicatively coupling the user device 14 to the network 26. The network interface 68 may include a wireless transceiver operating according to either the Wi-Fi standard or a cellular communications standard. The user device 14 also includes a local wireless network interface 70 which includes a wireless transceiver operating according to one of the Bluetooth, Zigbee, IEEE 802.11, or like standards for communicating with the media player 34 in the local wireless network 32. The user device 14 may also include a user interface 72 having one or more components for playing content and interacting with a user. For example, the user interface 72 may include components such as a display, one or more speakers, a microphone, and a keyboard or touch buttons.

Figure 9:
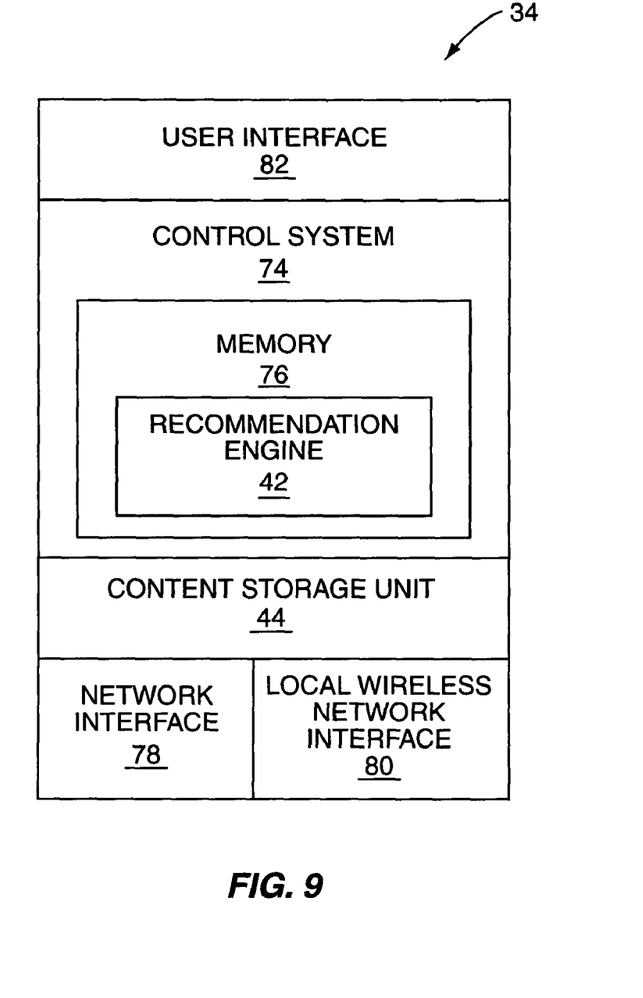
FIG. 9 illustrates an exemplary embodiment of a media player according to one embodiment of the present invention.

FIG. 9 is a block diagram of an exemplary embodiment of the media player 34. In general, the media player 34 includes a control system 74 and associated memory 76. The memory 76 may store software corresponding to the recommendation engine 42. However, the recommendation engine 42 may be implemented in software, hardware, or a combination thereof. The media player 34 also includes the content storage unit 44 which may be implemented as memory such as RAM or some other storage device such as a hard disc drive. Note that the content storage unit 44 may alternatively be implemented within the memory 76. The media player 34 also includes a network interface 78 communicatively coupling the media player 34 to the network 26. The network interface 78 may include a wireless transceiver operating according to either the Wi-Fi standard or a cellular communications standard. The media player 34 also includes a local wireless network interface 80 which includes a wireless transceiver operating according to one of the Bluetooth, Zigbee, IEEE 802.11, or like standards for communicating with the user devices 14-18 in the local wireless network 32. The media player 34 may also include a user interface 82 having one or more components for playing content and interacting with a user. For example, the user interface 82 may include components such as a display, speakers, and a keyboard or touch buttons.

The present invention provides substantial opportunity for variation without departing from the spirit or scope of the present invention. For example, while the present invention has been described above as recommending content to a media player, the present invention is equally applicable to other devices. For example, the present invention may be used to recommend settings for a lighting control system such that a lighting level for a room associated with the local wireless network 32 is a low lighting level when the most popular music genre among the user devices 14-18 is "Jazz." As another example, while the present invention has been described above as being implemented with the user devices 14-22, the present invention may be implemented with stationary devices or a combination of mobile devices and stationary devices. Still further, the media player 34 or other device to which content or settings are recommended may be mobile or stationary.

Those skilled in the art will recognize improvements and modifications to the preferred embodiments of the present invention. All such improvements and modifications are considered within the scope of the concepts disclosed herein and the claims that follow.

What is claimed is:

1. A method of influencing operation of devices associated with a local network comprising:
    identifying a plurality of user devices on the local network at a recommendation engine, each of the plurality of user devices storing media items and content information describing the media items;
    obtaining the content information at the recommendation engine, the content information describing the media items for the plurality of user devices;
    recommending a play list at the recommendation engine, the play list including the media items from more than one of the plurality of user devices for at least one of the plurality of user devices associated with the local network based on the content information obtained for the plurality of user devices;
    comparing content information describing media items accessible to a media player with the media items on the play list;
    selecting actual media items to play based on the comparison, wherein the media items accessible to the media player that match the media items on the play list are selected as the actual media items; and
    applying weights to the content information for the plurality of user devices based on an amount of time each of the plurality of user devices has been in the local network, wherein recommending the play list from the more than one of the plurality of user devices is further based on the weights applied to the plurality of user devices.

2. The method of claim 1 wherein obtaining the content information for each of the plurality of user devices comprises:
    obtaining information identifying the plurality of user devices from the plurality of user devices; and
    obtaining the content information for the plurality of user devices from a central node based on the information identifying the plurality of user devices, wherein the central node operates to obtain and store the content information for the plurality of user devices.

3. The method of claim 1 wherein obtaining the content information for the plurality of user devices comprises obtaining the content information for the plurality of user devices from the plurality of user devices.

4. The method of claim 1 wherein the at least one of the plurality of user devices comprises a media player.

5. The method of claim 4 wherein recommending the play list comprises generating the play list based on the content information for the plurality of user devices wherein the play list comprises criteria enabling the media player to select actual content to play.

6. The method of claim 5 wherein the media player is enabled to play audio content and generating the play list comprises generating the play list such that the criteria enable the media player to select actual audio content to play.

7. The method of claim 5 wherein the media player is enabled to play a radio station and generating the play list comprises generating the play list such that the criteria enable the media player to select the radio station from a plurality of radio stations.

8. The method of claim 5 wherein the media player is enabled to play television content and generating the play list comprises generating the play list such that the criteria enable the media player to select the television content from content played on a plurality of television stations.

9. The method of claim 5 wherein the media player is enabled to display a digital image and generating the play list comprises generating the play list such that the criteria enable the media player to select the digital image from a plurality of digital images.

10. The method of claim 5 wherein the media player is enabled to display a slideshow comprising a plurality of digital images and generating the play list comprises generating the play list such that the criteria enable the media player to select the slideshow from a plurality of slideshows.

11. The method of claim 4 wherein the media items stored by the plurality of user devices comprises a plurality of songs, the content information comprises at least one of a genre, artist name, album name, and title for each of the plurality of songs, and recommending the play list comprises providing at least one of a group consisting of: at least one genre from the content information for the plurality of user devices, at least one artist from the content information for the plurality of user devices, at least one album for the plurality of user devices from the content information for the plurality of user devices, and at least one song from the content information for the plurality of user devices as the play list.

12. The method of claim 4 further comprising obtaining the actual media items matching the play list from a remote source.

13. The method of claim 4 further comprising obtaining information identifying actual media items played or actual media items that would be played by another user device in response to at least one criterion from the play list.

14. The method of claim 1 further comprising:
    applying weights to the content information for the plurality of user devices based on a received signal strength associated with each of the plurality of user devices in the local network;
    wherein recommending the play list from the more than one of the plurality of user devices is further based on the weights applied to the plurality of user devices.

15. The method of claim 1 further comprising:
    applying weights to the content information for the plurality of user devices based on a distance of each of the plurality of user devices from the at least one of the plurality of user devices;
    wherein recommending the play list for the at least one of the plurality of user devices is further based on the weights applied to the plurality of user devices.

16. The method of claim 1 further comprising:
    applying weights to the content information for the plurality of user devices based on a pre-arranged relationship between a user of the at least one of the plurality of user devices and an operator associated with the at least one of the plurality of user devices;

wherein recommending the play list for the at least one of the plurality of user devices is further based on the weights applied to the plurality of user devices.

17. The method of claim 1 wherein the at least one of the plurality of user devices comprises a lighting control system and recommending the play list for the at least one of the plurality of user devices comprises recommending at least one setting for the lighting control system based on the content information for the plurality of user devices.

18. The method of claim 1 wherein the content information further comprises the content information describing the media items stored by at least one additional user device not within the local network that is associated with another of the plurality of user devices.

19. A media player comprising:
  a) a first communication interface for communicating with a plurality of user devices within a local network; and
  b) a control system associated with the first communication interface and adapted to:
    i) identify the plurality of user devices on the local network, each of the plurality of user devices storing media items and content information describing the media items;
    ii) obtain the content information describing the media items for the plurality of user devices;
    iii) recommend a play list for the media player including the media items from more than one of the plurality of user devices based on the content information obtained for the plurality of user devices;
    iv) compare content information describing media items accessible to the media player with the media items on the play list;
    v) selecting actual media items to play based on the comparison, wherein the media items accessible to the media player that match the media items on the play list are selected as the actual media items; and
    vi) apply weights to the content information for the plurality of user devices based on an amount of time each of the plurality of user devices has been in the local network, wherein recommending the play list from the more than one of the plurality of user devices is further based on the weights applied to the plurality of user devices.

20. The media player of claim 19 further comprising a second communication interface for communicating with a network, wherein the control system is further adapted to obtain the actual media items matching the play list from a remote source via either the first communication interface or the second communication interface.

21. The media player of claim 20 wherein the remote source is selected from a group consisting on one of the plurality of user devices within the local network, a user device not within the local network via the network, another media player via the network, and a network node coupled to the network.

* * * * *